United States Patent
Price et al.

(10) Patent No.: US 7,664,015 B2
(45) Date of Patent: Feb. 16, 2010

(54) INSPECTION SYSTEM WITH DATA ACQUISITION SYSTEM INTERCONNECT PROTOCOL

(75) Inventors: John Price, Brentwood, NH (US); Alan Roy Sieving, Waltham, MA (US); James Angelo Karon, Medford, MA (US)

(73) Assignee: L-3 Communications Security & Detection Systems, Woburn, MA (US)

(*) Notice: Subject to any disclaimer, the term of this patent is extended or adjusted under 35 U.S.C. 154(b) by 666 days.

(21) Appl. No.: 10/969,660

(22) Filed: Oct. 20, 2004

(65) Prior Publication Data

US 2006/0083257 A1    Apr. 20, 2006

(51) Int. Cl.
*G01R 31/08* (2006.01)
*G06F 15/16* (2006.01)
*G06F 11/00* (2006.01)
*H04B 7/212* (2006.01)

(52) U.S. Cl. .................. 370/229; 370/236; 370/444; 709/204; 709/231

(58) Field of Classification Search ............... 370/444, 370/229, 236; 709/204, 231
See application file for complete search history.

(56) References Cited

U.S. PATENT DOCUMENTS

| | | | |
|---|---|---|---|
| 4,486,739 A | | 12/1984 | Franaszek et al. |
| 5,870,449 A | * | 2/1999 | Lee et al. ................ 378/57 |
| 5,926,457 A | | 7/1999 | Feng |
| 5,933,654 A | * | 8/1999 | Galdun et al. ............ 710/23 |
| 6,092,116 A | * | 7/2000 | Earnest et al. ........... 709/236 |
| 6,105,079 A | * | 8/2000 | Kuo et al. ............... 710/25 |
| 6,345,323 B1 | | 2/2002 | Beasley et al. |
| 6,347,347 B1 | * | 2/2002 | Brown et al. ............ 710/23 |
| 6,363,438 B1 | * | 3/2002 | Williams et al. .......... 710/22 |
| 6,385,666 B1 | | 5/2002 | Thornton et al. |
| 6,609,151 B1 | * | 8/2003 | Khanna et al. ........... 709/222 |
| 6,615,305 B1 | * | 9/2003 | Olesen et al. ............ 710/262 |
| 6,885,007 B2 | * | 4/2005 | Donaghue et al. ......... 250/394 |
| 7,298,694 B2 | * | 11/2007 | Kamiya et al. ........... 370/218 |
| 2002/0085582 A1 | * | 7/2002 | Kim ..................... 370/445 |
| 2003/0147420 A1 | * | 8/2003 | Beckwith ................ 370/466 |
| 2004/0004975 A1 | * | 1/2004 | Shin et al. .............. 370/471 |
| 2005/0066000 A1 | | 3/2005 | Liaw et al. |

(Continued)

OTHER PUBLICATIONS

USB 2.0 Specification; pp. 1-4, printed at http://www.usb.org/developers/docs on Jan. 10, 2007.

(Continued)

*Primary Examiner*—Chi H Pham
*Assistant Examiner*—Farah Faroul
(74) *Attorney, Agent, or Firm*—Wolf, Greenfield & Sacks, P.C.

(57) ABSTRACT

An improved interconnection protocol that is well suited for use in an inspection system or similar modular electronic system. Communication is provided over a network where the electronic modules are nodes, including a root node and multiple remote nodes. The root node and remote nodes are connected through multiple point-to-point synchronous links. The root node and remote nodes are configured to send and receive packets in either a short form or a normal form. Timing between the root node and remote nodes is provided by an external clock distributed by the root node. Each remote node responds to commands with low latency. This protocol allows normal packets to be configured to provide variable payload length, with a maximum payload size that yields a low protocol overhead.

32 Claims, 7 Drawing Sheets

U.S. PATENT DOCUMENTS

| | | | |
|---|---|---|---|
| 2005/0076102 | A1 | 4/2005 | Chen et al. |
| 2005/0131922 | A1* | 6/2005 | Kennedy et al. ............ 707/100 |
| 2005/0198245 | A1 | 9/2005 | Burgess et al. |
| 2006/0064529 | A1 | 3/2006 | Anand et al. |
| 2006/0202964 | A1 | 9/2006 | Liaw et al. |

OTHER PUBLICATIONS

IEEE Standard for Heterogeneous InterConnect (HIC); pp. 1-6, printed at http://grouper.ieee.org/groups/1355/index.html on Jan. 10, 2007.

1394 Trade Association Technology; pp. 1-6, printed at http://www.1394ta.org/Technology/About/faq.htm on Jan. 10, 2007.

ITU. G.992.1 from Wikipedia; pp. 1-7, printed at http://en.wikipedia.org/wiki/G.DMT on Jan. 10, 2007.

Serial Front Panel Data Port (FPDP) Draft Standard VITA 17.1-199x; pp. 1-34, Jan. 30, 2002; Draft 0.6.

International Search Report in PCT/US05/37738, Nov. 13, 2006, 11 pages.

* cited by examiner

INSPECTION SYSTEM WITH DATA ACQUISITION SYSTEM INTERCONNECT PROTOCOL

BACKGROUND OF INVENTION

1. Field of Invention

This application relates generally to the interconnection of modules in electronic systems and more specifically to interconnections between electronic modules that carry large amounts of data.

2. Discussion of Related Art

Modern electronic systems are often constructed as separate modules. In use, commands and information pass between these modules. One example of an electronic system is an inspection system. For example, inspection systems are used at most airports to inspect baggage. Inspection systems are also used at ports or cargo terminals to inspect containerized cargo. These systems aid in the detection of contraband, such as explosives or illegal drugs, without the need for manually opening the baggage or cargo.

A common type of inspection system uses x-rays to irradiate the item being inspected. A series of detectors receives the x-rays after they have passed through the item being inspected. Information obtained from the detectors passes to a central analysis station where data processing equipment processes the data to automatically indicate the presence of contraband or to present the data in a way that aids a human operator to identify contraband.

For such systems to function properly, commands must be sent from a controller to the x-ray source and the x-ray detectors to coordinate their operation. Also, large amounts of data must be sent from the detectors to the centralized data analysis station.

For the system to function properly, the electronic modules that send information, such as data or commands, and those that receive the information must communicate using the same protocol. Many standard protocols are known. For example, USB 1.1/2.0, IEEE 1394b ("firewire"), ADSL G.dmt, IEEE 1355 ("heterogeneous interconnect"), VITA 17.1-199x ("serial front panel data port") are all examples of known serial protocols. Each of these protocols has strengths and weaknesses that make each protocol well suited for some applications but not others.

Accordingly, it would be desirable to provide an interconnection protocol that is well suited for use in an inspection system or other similar electronic systems.

SUMMARY OF INVENTION

One embodiment of the invention is directed to a network comprising a root node, a plurality of remote nodes, each comprising a receiver, a buffer and control logic, and a plurality of serial communication links interconnecting the root node to each of the remote nodes. Each link comprises at least one line carrying at least two types of packets from the root node to the remote node, and at least one line carrying packets from the remote node to the root node. A first type of packet received at the remote node is stored in the buffer and processed by the control logic in order of reception and a second type of packet received at the remote node causes an interrupt to the control logic whereby the second type of packet is processed by the control logic in response to interrupt.

Another embodiment of the invention is directed to a method of operating an electronic system comprising a network, the network comprising a root node and a plurality of remote nodes. The method comprises sending packets of a first type and packets of a second type from the root node a remote node, and at the remote node, buffering and then processing the packets of the second type, and processing without buffering the packets of the first type.

A further embodiment of the invention is directed to a method of operating an electronic system having an application level and a network. The network comprises a plurality of nodes, with each of the nodes having packet processing circuitry that sends packets over the network in response to commands from an application layer of the electronic system. The method comprises sending packets of a second type between the first node and a second nodes, and when the first node receives from the application layer a command to transmit a command while transmitting a packet of the second type, interrupting transmission of the packet and transmitting a packet of the first type communicating the command.

Another embodiment of the invention is directed to a method of operating a network having a physical link between at least a first node and a second node. The method comprises providing a plurality of units of information to transmit from the first node to the second node, encoding each of the units of information with a sequence of logical HIGHs and logical LOWs, with the number of logical HIGHs and logical LOWs in each unit being equal, and transmitting electrical signals representing the sequence of logical HIGHs and LOWs for each of the units over the link, with the electrical signals being AC coupled to the link.

A further embodiment of the invention is directed to a data acquisition system, comprising a data processor, a plurality of electronic modules, each acquiring data in response to a command, and a network interconnecting the plurality of electronic modules and the data processor. The network comprises a root node coupled to the data processor and a plurality of remote nodes, each remote node coupled to one of the electronic modules, the root node and each of the remote nodes having packet processing circuitry adapted to process at least a first type of packet and a second type of packet, the packet processing circuitry including a buffer adapted to store the second type of packet and bypass circuitry for the first type of packet.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
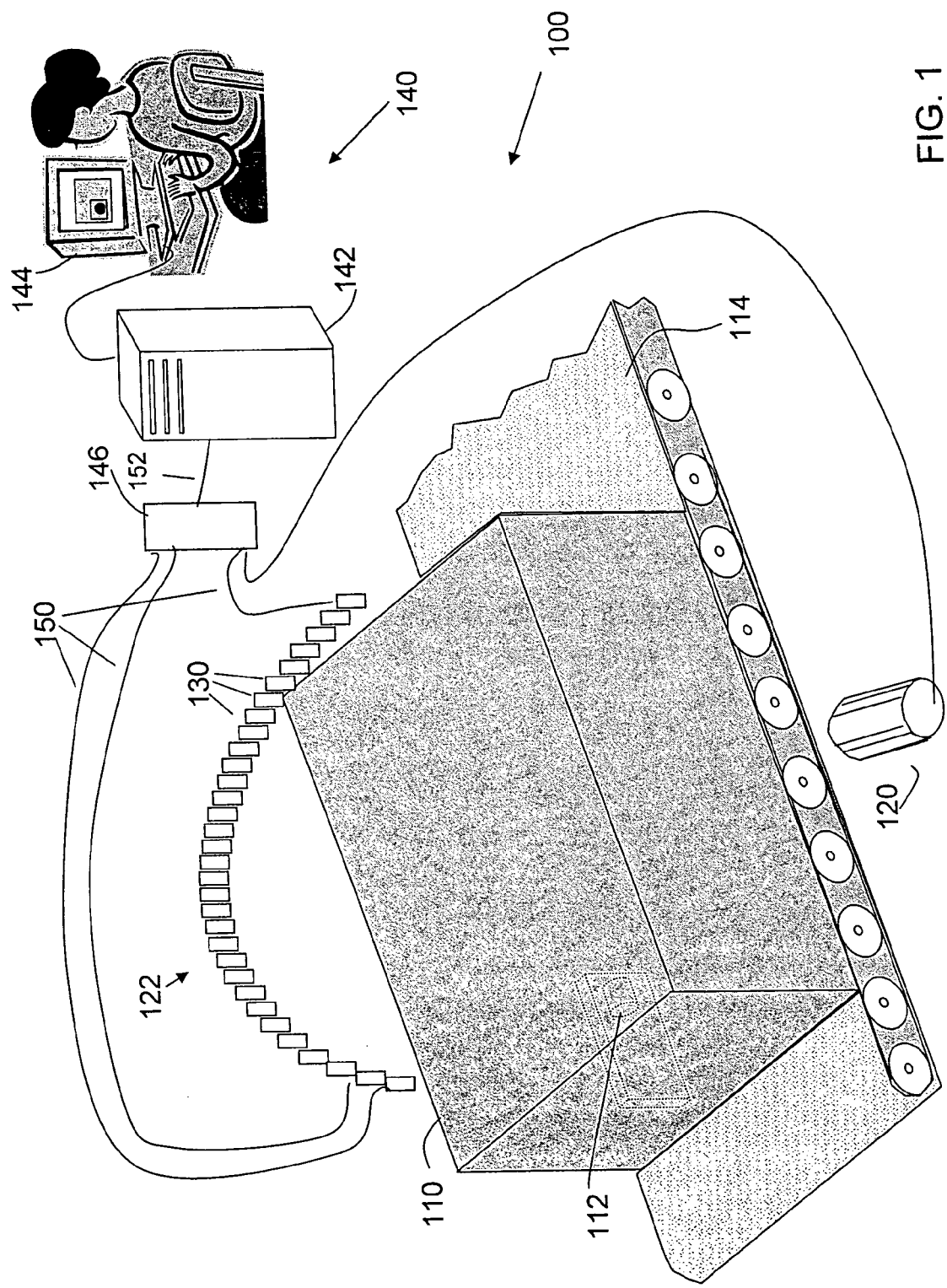
FIG. 1 is a sketch of an inspection system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 shows a sketch of a data acquisition system made of multiple electronic modules. The modules are connected to nodes on a network, which allows the modules to exchange information, such as commands and data.

In the illustrated embodiment, the data acquisition system is an inspection system. Such a system might be used in inspecting baggage or cargo for explosives or other contraband. Here, inspection system 100 is gathering data on container 110. This data is processed to identify contraband 112 within the container.

Conveyor 114 moves container 110 relative to a radiation source 120 and a radiation detector array 122. Relative motion of the container 110, source 120 and detector array 122 allows data on many parts of container 110 to be gathered. Individual detectors 130 in detector array 122 pass data to a data analysis system 140.

In the illustrated embodiment, data analysis system 140 includes a computer 142. Computer 142 contains software that processes data from detectors 130 and creates an image of the item being inspected, in this case container 110. The image of the item being inspected is displayed on display 144 for viewing by a human operator. In the illustrated embodiment, computer 142 contains software that analyzes the data to recognize features that indicate contraband inside container 110. Objects corresponding to potential contraband are identified for the human operator on display 144.

In the data acquisition system illustrated in FIG. 1, information is exchanged over a network. For example, computer 142 sends commands that control the operation of various electronic modules in the system over the network. Data gathered by modules within the system are also passed back to computer 142 over the same network.

Analysis system 140 includes a root node 146 of the network. Root node 146 is connected by cables 150 to electronic modules in the inspection system. For example, cables 150 run from root node 146 to individual detectors 130 and to radiation source 120.

Root node 146 is connected to computer 142 over a bus 152. As one example, computer 142 could be a desk top computer and bus 152 might be the internal PCI bus of that computer. Root node 146 could be implemented like a network interface card often found in computers.

For the inspection system 100 to properly operate, the various modules within the system must be coordinated. For example, as conveyor 114 moves container 110 past radiation source 120, the source 120 and detectors 130 must be turned on. These operations must be synchronized so that data analysis system 140 can correlate data collected by individual detectors 130 with specific locations inside container 110. For that to happen, commands sent by computer 142 over the network must be executed with little delay. For example, the x-ray source 120 must be turned on when commanded by computer 142 so that the appropriate locations in container 110 are irradiated. Simultaneously, detectors 130 must be turned on so that they capture data while the item being inspected is irradiated. Thus, one requirement on the network interconnecting the electronic modules of the data acquisition system is that it communicate command messages with very low latency.

Detector array 122 might gather substantial data to inspect one item such as a container 110. All of this data must be passed back to computer 142. To allow the inspection system 100 to operate as efficiently as possible, the network interconnecting the electronic modules inside the inspection system 100 should operate at a high data rate.

Figure 2:
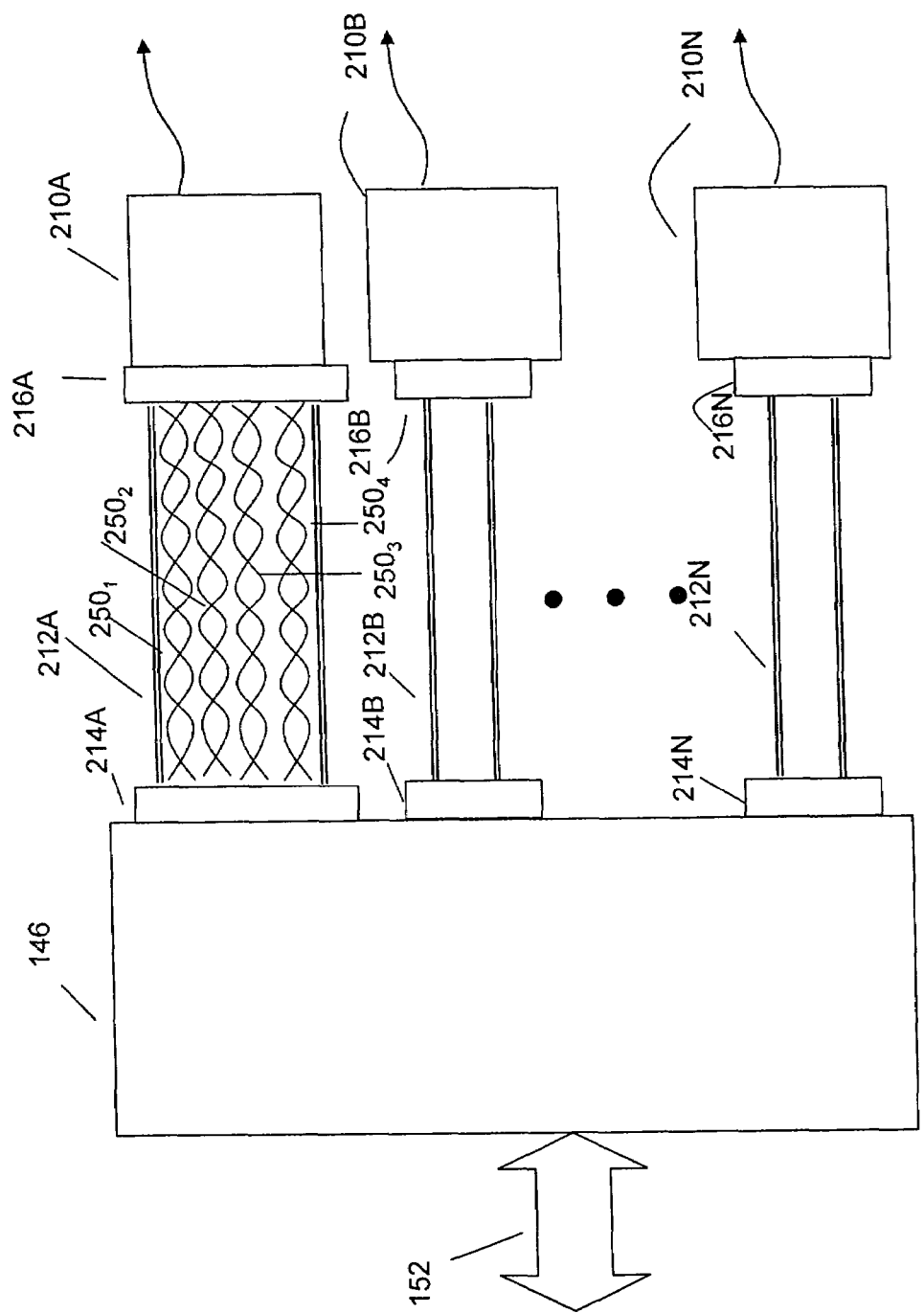
FIG. 2 is a block diagram illustrating nodes of the network used in the inspection system of FIG. 1.

FIG. 2 shows a schematic of the network used in inspection system 100. Root node 146 has an interface to bus 152. Root node 146 is connected to multiple remote nodes 210A, 210B . . . 210N. Each remote node is connected to the root node through a separate link. The number of remote nodes to which the root node can be directly connected in the preferred embodiment depends on the address space for the network defined in the network protocol. The address space in turn depends on the number of bits allocated for addresses in each network packet. In the embodiment used as an example, 5 bits are allocated for a link address, allowing 32 remote nodes to be directly connected to the root node. Each of the remote nodes 210A, 210B, . . . 210N is the first node in a link. To allow for communications among more than 32 remote nodes, the network protocol is established to allow multiple nodes to be "daisy chained" in each link.

Messages originating at the root node are said to be outbound messages. Messages sent to the root node are said to be inbound messages. As each remote node receives an outbound message it passes it to the next outbound node in the chain. Conversely when a remote node receives an inbound message it passes it to the next inbound node in the chain. For simplicity of implementation, the described embodiment of the network protocol does not allow one remote node to send a message to another remote node. However, variations on the described embodiment could be created by allowing remote nodes to form packets with addresses indicating the recipient of the packet is another remote node.

Each of the remote nodes 210A, 210B . . . 210N is connected to root node 146 through a cable 212A, 212B . . . 212N. Each of the cables has a connector on each end, such as connector 214A and 216A. Focusing on cable 212A as an illustration of all of the cables, the cable contains multiple signal conducting paths. In the illustrated embodiment, each of the signal paths is a twisted pair $250_1$, $250_2$, $250_3$ or $250_4$. In the illustrated embodiment, four signal paths are used in each cable.

In the preferred embodiment, each of the cables 212 is formed from CAT-5 cable. The connectors 214A and 216A terminating the cable can be industry standard RJ-45 plugs. Each of the remote nodes 210A, 210B . . . 210N and the root node 146 contain RJ-45 receptacles to receive these plugs. Where a remote node is daisy chained with other remote nodes, similar cable and similar connectors are used to interconnect the remote nodes.

Figure 3:
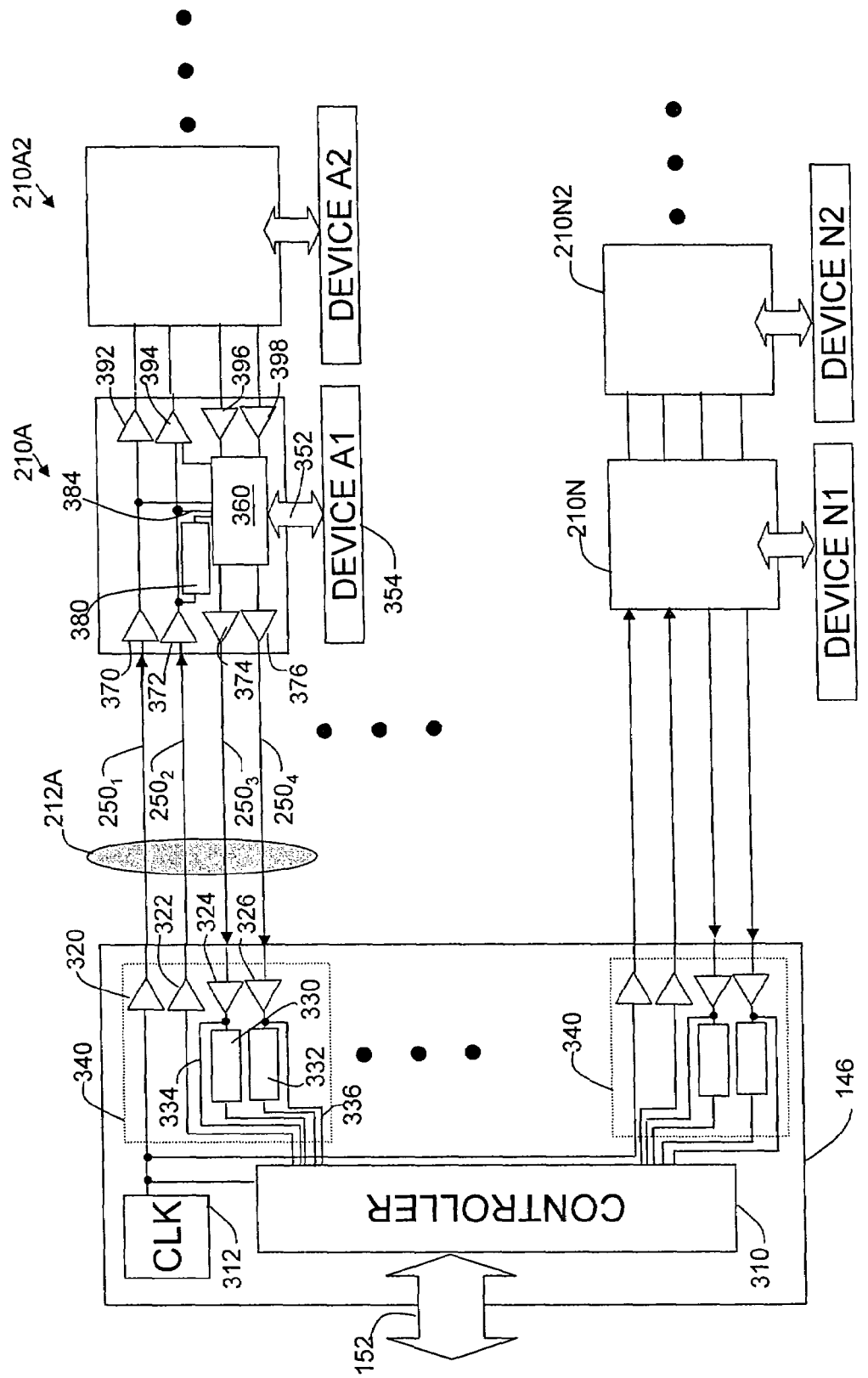
FIG. 3 shows the nodes of the inspection system in FIG. 1 in greater detail.

FIG. 3 provides an alternative view of the network configuration shown in FIG. 2. Root node 146 includes a controller 310. Controller 310 is logic circuitry that manages the interface between the network and a computer or other device connected to the network through bus 152. Controller 310 might be implemented as N different digital state machines, each one controlling communication with one of the links.

Root node 146 also includes a clock 312. Clock 312 is distributed to all of the remote nodes in the network and is the time base to which all communications are synchronized. The precise frequency of the clock is not important to the invention. However, the clock rate is preferably between 20 MHz and 100 MHz. More preferably, the clock rate is approximately 50 MHz. In the preferred embodiment, operations in the network are synchronized to the leading and falling edge of the clock, allowing bits to be transmitted over each signal path at a rate double the clock rate. Clock 312 provides a timing signal to controller 310. Clock 312 is also supplied to transmitter 320 for transmission over one of the signal paths $250_1$ in cable 212A.

Each of the links has an interface circuit 340. Each interface circuit has a set of transmitters and receivers. In the preferred embodiment, each of the signal lines $250_1$, $250_2$, $250_3$, $250_4$ is unidirectional. Lines $250_1$ and $250_2$ carry outbound information. Signal lines $250_3$ and $250_4$ carry inbound information.

Transmitter 320 connects to clock 312 to provide a clock signal to the remote nodes connected through cable 212A. In the preferred embodiment, transmitter 320 transmits Low Voltage Differential Signals (LVDS). These signals are preferably AC coupled to line $250_1$ for increased noise immunity. AC coupling may be achieved with a transformer in each of the connectors such as 214 and 216 or by any other convenient means.

Transmitter 322 is also an LVDS transmitter AC coupled to signal line $250_2$. Transmitter 322 transmits packets of information generated by controller 310. The format of packets of information generated by controller 310 is described below.

Two of the signal lines in cable 212A are dedicated for inbound messages. Signal lines $250_3$ is connected to receiver 324. Signal $250_4$ is connected to receiver 326. Each of receivers 324 and 326 receives LVDS signals from remote node 210A. As with the transmitters, the receivers are AC coupled to the signal lines for greater noise immunity.

Packets of information received by receiver 324 are passed to controller 310. Multiple paths are provided for passing information to controller 310. A packet may be stored in buffer 330. Because each link has multiple inbound lines and there are multiple links in the data acquisition system, controller 310 may be responding to one packet when a subsequent packet is received. Buffer 330 stores a received packet until controller 310 is available to process it.

A bypass path 334 is also provided to allow packets to be sent from receiver 324 to controller 310 without passing through buffer 330. In the data acquisition system of FIG. 1, incorrect operation may result if the execution of some commands is delayed. These commands preferably are not transmitted in messages that are buffered. The delay introduced while the packet is in the buffer waiting for controller 310 to process it may produce an unintended operating condition in the system. For example, one of the remote nodes might function as a "strobe generator." The strobe generator transmits packets commanding the root node to issue commands to other root nodes instructing those nodes to sample data. For the data collection to be appropriately synchronized, the root node should respond to the command from the strobe generator without delay.

Therefore, buffer 330 includes bypass path 334. Certain packets of information will be specified as immediate packets. In the example embodiments, immediate packets are used for commands and acknowledgements that should be executed without delay. Rather than storing the packets in buffer 330, receiver 324 will generate an interrupt to controller 310 upon receipt of an immediate packet. Controller 310 will immediately read the packet, thus effectively bypassing buffer 330.

Signal line $250_4$ is also an inbound signal line and functions similarly to signal line $250_3$. Signal line $250_4$ is connected through receiver 326 to buffer 332. As with buffer 330, buffer 332 contains a bypass path 336.

Interface circuit 340 as pictured in FIG. 3 illustrates the functional components of the circuit. Circuitry to implement transmitters, receivers, buffers and circuits that generate interrupts in response to certain types of message packets are well known in the art. Any convenient implementation might be used. For example, interface circuit 340 might be implemented as an Application Specific Integrated Circuit (ASIC).

Each of the links connecting to one of the remote nodes 210A . . . 210N includes a similar interface circuit. Where each interface circuit is an ASIC, root node 146 might be implemented as a printed circuit board with multiple integrated circuit chips attached to it.

FIG. 3 shows that the network has multiple remote nodes. Taking remote node 210A as an example, the remote node communicates with a device, such as device 354. In the data acquisition system illustrated in FIG. 1, device 354 is an electronic module in the system. In the example of an inspection system, the device 354 might be a radiation source 120 or one of the detectors 130 or some group of detectors in the array.

Remote node 210A includes a controller 360. Controller 360 communicates with device 354 over a bus 352. FIG. 3 shows the interconnection between controller 360 and device 354 to be a standard bus 352 with the same bus format used for all of the nodes. Using a standard interface allows the circuitry within each remote node to be the same for each of the nodes in the data acquisition system, thereby simplifying the construction. However, it is not necessary that controller 360 interface to device 354 in a standard format. For example, discrete wiring might be used to interconnect controller 360 and device 354.

Remote node 210A includes receivers 370 and 372 connected to the outbound lines in cable 212A. Receiver 370 couples the clock signal to controller 360. The output of receiver 370 provides the time base for the circuitry in node 210A.

Receiver 372 is connected to lines $250_2$, which carries packets sent by root node 146. The output of receiver 372 runs to a buffer 380. As in root node 146, packets may be placed in the buffer 380 until controller 360 is available to process the packet.

Also, as in root node 146, a bypass path 384 is provided. Certain packets sent by root node 146 are immediate packets. These packets are not stored in buffer 380. Rather they generate an interrupt to controller 360, causing controller 360 to read the packet immediately. In this way, buffer 380 is bypassed.

Transmitters 374 and 376 transmit packets of information generated by controller 360. Packets might contain various types of information, such as commands or data. For example, controller 360 might communicate to root node 146 that it has no assigned address and needs an address by sending a packet.

As another example, packets might contain data gathered by device 354 for transmission to data analysis system 140 (FIG. 1).

In the described embodiment, two inbound links are shown for communicating information from remote node 210A to root node 146. However, any number of inbound links might be used.

Remote node 210A also includes transmitters 392 and 394 and receivers 396 and 398. These components are included to allow daisy chaining of remote nodes. Remote node 210A retransmits the signal it receives on line $250_1$ through transmitter 392. In this way, the clock used to provide a time base for the entire data acquisition system is passed on to other remote nodes in the chain. Likewise transmitter 394 retransmits packets received on line 250₂. In the illustrated embodiment, a direct condition is provided between receiver 370 and transmitter 392. A direct connection is also provided between receiver 372 and transmitter 394. These direct connections allow nodes to be daisy chained with little latency introduced at each node in the chain. In an illustrative embodiment, one bit time of delay is introduced between receipt of a bit at one of the receivers 370 or 372 and retransmission on its associated transmitter 392 and 394.

Connections are also provided for retransmission of inbound messages to allow daisy chaining of remote nodes. Receivers 396 and 398 receive inbound messages. Preferably, these inbound messages pass through controller 360 without buffering and are retransmitted by transmitters 374 and 376.

Each of the other remote nodes in the system includes circuitry such as shown in detail for node 210A. Each node is implemented in any convenient way, such as with a single chip or as circuitry inserted into electronic modules.

Figure 4:
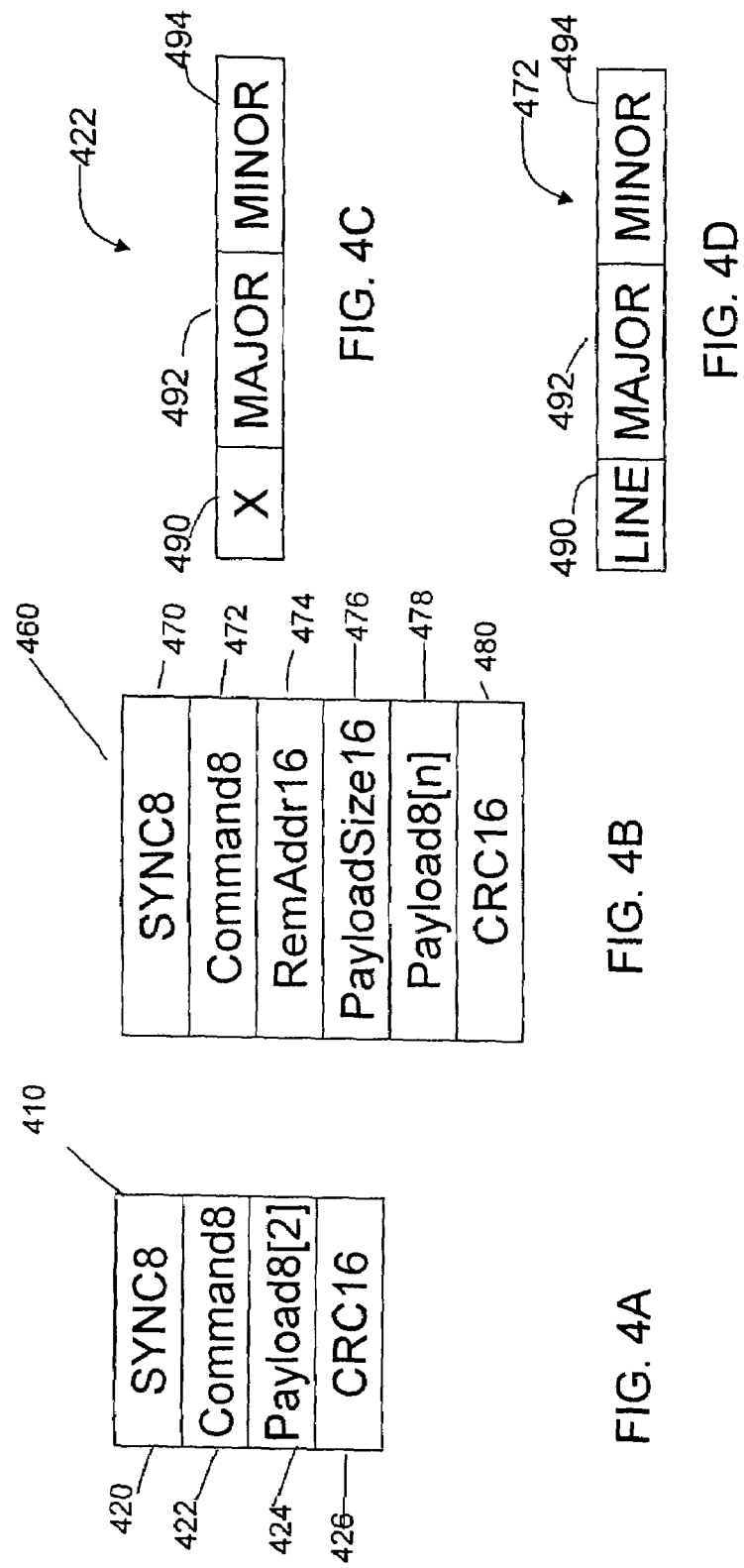
FIGS. 4A and 4B are sketches illustrating packet formats.
FIGS. 4C and 4D are sketches indicating the command fields in the packets of FIGS. 4A and 4B, respectively.

FIGS. 4A and 4B show examples of packets that can be transmitted with the network protocol described herein. FIG. 4A illustrates a short packet 410. FIG. 4B illustrates a standard packet 460.

Standard packets are buffered upon receipt, such as in buffers 330, 332, or 380. Short packets are intended to be executed immediately.

Short packet 410 is shown to contain four fields 420, 422, 424 and 426. Field 420 is the synchronization field. A valid packet has a specific synchronization code in field 420. Preferably the synchronization code is not used in any other field of any packet. In this way, a receiver, such as receiver 324 or 326 can recognize the beginning of a packet.

Field 422 is the command field. The value in this field indicates the command to be performed by the node receiving the packet 410. In the preferred embodiment, command field 422 encodes an 8 bit value, making possible as many as $2^8$ command codes. In the illustrated embodiment, the specific command code dictates whether the packet is a short packet or standard packet.

Field 424 holds the payload for short packet 410. Payload refers to data that might not be used by network hardware in processing the packet. The payload can be used by the application that receives the packet.

In the case of short packet 410, the payload size is limited. In the illustrated embodiment, field 424 contains two 8 bit bytes. The most common use for field 424 is to provide an argument for the command identified in field 422. For example, if field 422 contains a value that indicates short packet 410 is being sent by the root node to a remote node to assign an address to the remote node, field 424 stores the value of the address being assigned.

Field 426 is included in short packet 410 for error checking. In the illustrated example field 426 contains a Cyclical Redundancy Check (CRC) value. This CRC value is the sum of all of the other bytes in short packet 410. This sum is computed and inserted in field 426 by the hardware sending packet 410 over the network. When the packet is received, the sum of all of the received bytes in the packet can be computed. The sum upon receipt can be compared to the value stored in field 426. If the sum of the received bytes does not match the CRC value stored in field 426, the receiving hardware detects that an error in transmission has occurred.

Short packet 410 does not contain an express address field to identify the node to act upon the command contained in field 422. In the preferred embodiment, implementation of the network is simplified by not allowing one remote node to send a command to another remote node. Therefore, any short packet 410 sent by a remote node is intended for the root node.

Accordingly, a remote node, such as remote node 210A described above, receiving a short packet on its inbound link such as at receiver 396 or 398 simply passes the packet through to its outbound link, such as through transmitter 374 or 376.

For short packets sent by the root node, the root node will generally transmit the short packet 410 only on the link containing the remote node intended to act upon the command in field 422 of the short packet. For example, if node 210A is intended to act upon the command, root node 146 will transmit the short packet over link 212A.

Several possibilities exist for determining which remote nodes on the link should respond to the command. One possibility is that all remote nodes daisy chained on link 212A are intended to respond to the command. For example, the data acquisition system shown in FIG. 1 could be configured such that each link contains remote nodes that control the operations of portions of an array of detectors that are intended to simultaneously gather data. Thus a command sent over link 212A performs the desired result of activating all of the detectors in the array.

A second possibility is that each node in a daisy chain can determine from context whether the command is intended for it. For example, if the command in field 422 indicates that root node 146 is assigning an ID value to a node, each node that had already been assigned an ID value can determine from context that the command is not addressed to it. Likewise, if the command indicates that all detectors in the system should acquire data samples, only detectors on the link would respond to the command.

A third possibility is that the payload field 424 can be used to indicate the remote nodes to act upon the command in field 422.

FIG. 4B is a sketch of the format of a standard packet 460. Standard packet 460 includes fields 470, 472, 474, 476, 478 and 480. Field 470 is a synchronization field, like synchronization field 420. Field 472 is a command field, like command field 422.

Field 474 is the address field. In an inbound packet, it contains the address of the node that sent the packet. In an outbound packet, that contains the address of the node that is intended to respond to the command in standard packet 460. In the illustrated embodiment, sixteen bits are allocated for each remote node address. Sixteen address bits theoretically allows $2^{16}$ nodes in the network. However, in the presently preferred embodiment, not all 16 bits are used. Three of the sixteen bits are specified as "reserved." In defining a packet format for a new protocol, bits are often reserved. Hardware and software built to implement the protocol while bits are reserved is designed to ignore those bits. However, if it is later decided that additional information needs to be transmitted by each packet to support new functionality in the network, those reserved bits can be used to transmit information needed to support a new function. Hardware and software developed before the new function is added to the protocol can operate on the same network as devices that include hardware and software that perform the new function. The preexisting hardware simply ignores the bits that were in the reserved field, but does not perform the new function. Devices with hardware and software developed to perform the new functionality reads or uses the bits that were previously reserved.

Of the remaining sixteen bits in the address field, five bits are used to signify the link on which the remote node is connected. As shown in FIGS. 2 and 3, N links are connected to root node 146. Allocating five bits in field 474 to identify the link allows each of the 32 links connected to root node 146 to be identified. The remaining eight bits in field 474 are used to signify the level at which a node appears in its link. For example, remote node 210A is at level 1 in the link. Node 210A2 is at level 2 in the link. If more remote nodes are daisy chained in the link containing nodes 210A and 210A2, each successive node in the link is at the next higher level. Having eight bits available to specify a level allows 256 level addresses. However, root node 146 is always considered to be at level zero. Therefore a total of 255 remote nodes can be daisy chained in each link using eight bits to specify the link level. In total, the described embodiment allows for 8,160 remote node addresses.

This addressing convention does not use all possible bit combinations of the thirteen bits used in the address field 474. The unused bit combinations can be used to signify groups of nodes or for other purposes. For example, one bit combination that does not correlate to the address of a particular node can be used to signify a broadcast address. A packet with the broadcast address is intended to be acted upon by all nodes in the system. For example, the broadcast address might be used with a command to reset the system.

Field 476 is used in connection with field 478 to transmit a payload in standard packet 460. Field 476 indicates the number of bytes used in field 478 for the payload. Field 476 is sixteen bits long, allowing payload field 478 to contain up to $2^{16}$ bytes. Field 478 is the payload field. Field 478 can contain a variable number of bytes, with the possibility that a standard packet can contain much more information than could be transmitted in a short packet 410.

Field 480 contains a CRC value similar to the value in field 426. As above the CRC values aids in detecting transmission errors in a packet.

For further error detection, the bytes in the fields indicated in FIGS. 4A and 4B are encoded before transmission over a link. As is known, networks are often thought of as having multiple layers. Information can be represented differently at different layers of the network. For example, the physical layer includes the path between transmitters and receivers. The application layer can be thought of as the processing that occurs with the devices connected to network nodes. Information can be represented differently in the physical layer than in the application layer.

At the physical layer, a redundant code is preferably used. For example, a 4B6B coding scheme can be used. 4B6B means that each 4 bits of information as reflected in FIG. 4A or 4B is actually transmitted on the physical link as six bits. Preferably the 4B6B coding scheme will result in a DC balanced serial stream. DC balanced implies that each unit of information transmitted contains the same number of ones and zeros.

In encoding four bits in a 4B6B coding scheme, every possible value of the four bits is mapped to a six bit code word. For example, the four bit code, 0000, might be mapped to a six bit code 011010. The four bit code 0001 might be mapped to 001011. Each byte of information reflected in FIGS. 4A and 4B is broken into four bit "nibbles", which are then translated to one of these six bit codes for transmission. Upon reception, the six bit codes are translated back to the four bit codes and passed on for a higher level processing. In converting the six bit codes back to four bit values, the receiving node can detect if an error has occurred. If the six bit code does not match any valid four bit code, the receiving node identifies an error.

Use of redundant codes also allows out of band signaling. Transmitting each four bit nibble as a six bit code means that many six bit codes do not correspond to any valid piece of information to be transmitted over the network. Some of the codes that do not correspond to valid pieces of information can be used to transmit signaling information. For example codes can be used in synchronization field 420 or 470 that do not correspond to a value that should appear in any other field of either packet 410 or standard packet 460. For example, a synchronization value in fields 420 and 470 could be reflected by a code 111000 followed by 000111. Having a unique pattern to represent the synchronization field allows a receiver to identify the start of a new packet. Other codes that should never appear in any packet to be transmitted over the network can also be used to transmit idle codes so that all nodes stay synchronized while no packets are being transmitted. For example, an idle code might consist of 110011 followed by 001100.

Use of a redundant code also enables the use of a DC balanced code for increased noise immunity. Greater noise immunity in turn increases the effective rate at which information can be transmitted over a network because fewer packets suffer from errors, and so less time is spent retransmitting faulty packets. Because not all of the six bit codes are mapped to 4 bit nibbles, only those codes that have equal numbers of 1's and 0's need to be selected to represent valid values. Having equal numbers of 1's and 0's in every piece of information transmitted allows the voltages on lines carrying that information to have no DC component. Where each line represents a 1 and a 0 with voltages of opposite polarity, the average voltage on the line is zero when the line transmits a DC balanced code. All lines transmitting LVDS signals have a zero average voltage when transmitting a DC balanced code. Because the transmitted signals are DC balanced, AC coupling of signals to or from the line is possible. AC coupling provides noise immunity because decoupling the lines from reference potential reduces coupling of spurious signals to the line and increases the common made rejection ratio.

The packet formats as shown in FIGS. 4A and 4B provide several advantages. One advantage is that errors can be quickly detected at a low level of the network. For example, if a receiver detects a code word that does not match any valid four bit code, an error can be indicated. Likewise, if the CRC values such as 426 or 480 do not match the sum of the other values received in the packet, an error can also be indicated. Upon recognition of an error, a controller such as 310 or 360 controlling a node can "drop the packet" and send an indication to the node initiating the packet that it needs to be retransmitted.

A further advantage of the packet formats shown in FIGS. 4A and 4B is that messages initiating very different types of functions can be transmitted over the same network. Commands for which timing is critical can be sent using the short packet format 410. Messages that require the transmission of large amounts of data can be transmitted using standard packets with very little overhead using a standard packet. For example a standard packet 460 has only eight bytes of overhead, but can handle up to $2^{16}$ bytes of payload. Furthermore, the use of short packets and standard packets allows immediate commands to be sent. In a preferred embodiment, a node receiving a short packet will recognize and respond to the short packet within three periods of clock 312 (FIG. 3).

FIG. 4C shows the format of command field 422 such as might be used in a short packet 410. Field 422 is shown to be divided into three subfields. Subfield 490 is not used for short packets. Subfield 492 contains the major portion of the command identifier. Subfield 494 contains the minor portion of the command identifier. Table 1 gives examples of commands that would be useful in a data acquisition system.

TABLE 1

| Command Name | Major | Minor | Mode | Command Description |
|---|---|---|---|---|
| AssignID | 1 | 0 | Immediate Outbound | Set remote node ID number. The AssignID is a special case immediate action message. Unlike all other types of immediate action messages, it requires an acknowledgement. |
| StrobeData | 1 | 1 | Immediate Outbound | Command Remote to gather data. |
| MasterReset | 1 | 2 | Immediate Outbound | Reset master Remote-ID-map and Remote-ID's. Rediscover remote nodes and rebuild Remote-ID-map. |
| StrobeTime | 3 | 0 | Immediate Inbound | From a strobe generator, upon receipt by a master node, the master should then send a strobeData to remotes. |
| RemoteIDReq | 3 | 1 | Immediate Inbound | From a remote with no id. If a master node is in configure state, initiates AssignID. If master node is in a running state causes an immediate interrupt and master reset/ network discover remote sequence. |
| Read | 4 | 0 | Standard Outbound | Read from address payload size bytes. |
| Write | 4 | 1 | Standard Outbound | Write to address payload size byte. |
| NodeType | 4 | 2 | Standard Outbound | Returns node type. Could incorporate into status. |
| Status | 4 | 3 | Standard Outbound | Get node status |
| Reset | 4 | 4 | Standard Outbound | Reset addressed node, do not clear remote node ID. |
| Diag | 4 | 5 | Standard Outbound | Perform self-test. |
| LastNode | 4 | 6 | Standard Outbound | Do not retransmit upstream data. |
| Ack | 6 | 0 | Standard Inbound | Standard command response, command status and any requested data. |
| AckWait | 6 | 1 | Standard Inbound | Standard command response, master waits, holds response open for maximum time. |

The major portion of the command code is used to indicate the node in which the command is used. Certain command codes are used only in immediate mode, meaning that the node receiving the command interrupts its processing and immediately executes the command when received. Other command codes are used only for standard processing. Commands with standard command codes are buffered by the receiving node and executed from the buffer in the order in which they are received. Additionally, certain command codes are meaningful only for commands sent by the root node to remote nodes, while other command codes are meaningful only for messages sent from a remote node to the root node.

In the illustrated embodiment, three bits of field 422 are used for the major subfield 492. Table 1 indicates that a value of one in the major subfield is used to indicate an immediate outbound command. A value of three in major subfield 492 indicates an immediate inbound command. Providing a major subfield 492 reduces the number of bits that a receiving node must process to identify whether a received packet should be buffered or should be treated as an immediate packet. Minor subfield 494 indicates the specific command to be executed. Thus, the combination of major and minor subfields 492 and 494 provides the complete command code.

FIG. 4D indicates the subfields within command field 472 for a standard packet. Subfields 492 and 494 correspond to the major and minor subfields as described above in connection with FIG. 4C. Subfield 490 is used to indicate the line on which a response should be sent. For example, link 212A is shown to have two lines $250_3$ and $250_4$ carrying data in the inbound direction. A command sent on the outbound line $250_2$ would indicate in subfield 490 which of the inbound data lines should be used for sending a response. In the illustrated embodiment, subfield 490 contains a single bit because each link has only two inbound lines and a single bit is sufficient to indicate which of the two lines should be used.

Figure 5:
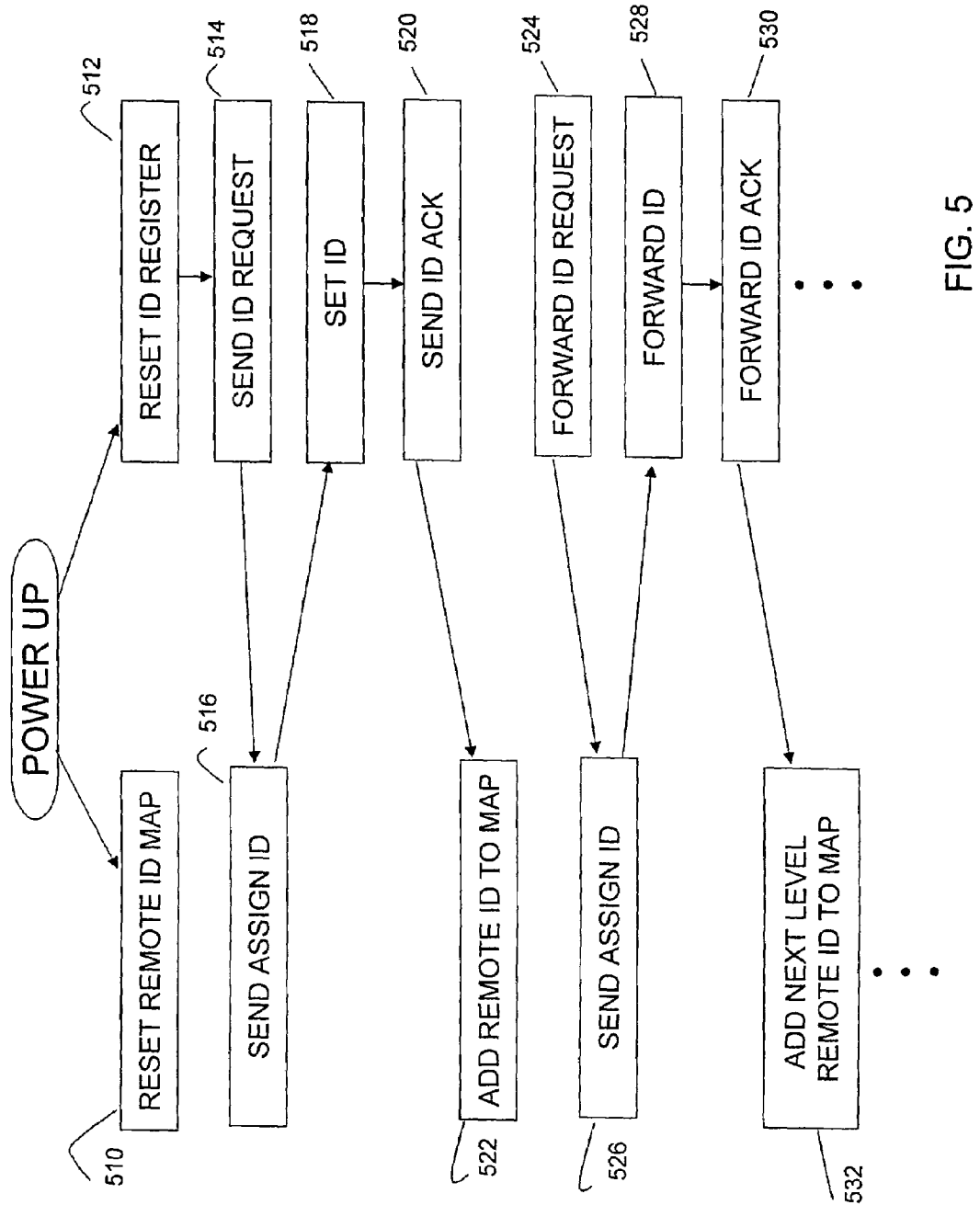
FIG. 5 is a flow chart useful in understanding the power up sequence of nodes on a network as shown in FIG. 3.

Turning to FIG. 5 the process by which ID's are assigned to each node in the network is shown. FIG. 5 depicts the steps taken by remote node 210A. However, each remote node will take a similar set of steps. The steps shown in FIG. 5 will be repeated until each of the nodes in the network has an assigned ID.

As described above, the root node is always given the ID 00. Each remote node is given an ID indicating the link through which it is connected to the root node and the level within that link. A "dynamic discovery process" is used to assign ID's to the remote nodes. The process shown in FIG. 5 begins upon power-up or other event that causes the addresses in the network to be reset. The left side of the figure indicates actions taken by the root node. The right side of the figure indicates actions taken by the remote nodes.

Upon a reset, the root node resets its remote ID map at step 510. The remote ID map can be any convenient memory structure within controller 310 that stores identifications for nodes in the network. Also in response to the power-up or other event that causes the ID values to be reset, the remote nodes reset ID registers at step 512. The ID register can be any convenient memory location within a controller such as 360.

At step 514, a remote node that lacks and ID sends a "ID request" message to the root node. As shown in Table 1, a remote ID request command is used in the immediate inbound mode. Therefore the ID request sent at step 514 is encoded as a short packet 410.

At step 516, the root node receives the remote ID request message. The root node then responds with an outbound short packet containing the assign ID command. The ID is encoded in the payload field of the short packet. The specific value of the ID assigned is determined by the root node using the link/level format described above. In particular, if the remote ID request arrived over link one, the beginning portion of the remote ID will indicate link one. The root node will assign the level portions of the ID's in order.

At step 518, the remote node receives the assign ID command. In response, the remote node stores the value of the ID in its ID register. At step 520 the remote node sends a packet containing an acknowledgement. As indicated in Table 1, an acknowledgement is sent in a standard packet format. At step 522 the root node receives the acknowledgement packet and adds the assigned ID to the remote ID map.

The ID discovery process pictured in FIG. 5 continues until all remote nodes have been assigned ID's. If other remote nodes at lower levels of the link have not been assigned ID's, they will send inbound packets containing the remote ID request command. Prior to the time that node 210A receives an ID, it ignores the inbound remote ID request commands it is receiving. However, once a remote node receives an ID, it forwards the remote ID request commands it receives from nodes at higher levels in its link.

At step 526, the root node responds to the remote ID request command. As above, the root node sends the assign ID command from a node at a lower level in the link. The ID assigned will contain the link and the next level in that link which has not previously been assigned as an ID. This message is sent to the first node in the link. Because node 210 has already received an ID, it forwards the assign ID packet to the next node daisy chained in the link. The assign ID command will be passed down the chain of nodes in the link until it is received by a node that has not had an ID assigned. That node will store the ID and respond with an acknowledgment packet. The inbound packet will be forwarded on by all lower level nodes in the link that have already been assigned ID's.

The node that eventually stores the ID will generate an ID acknowledgement message that is passed up the chain in the inbound direction. When received at the root node, the root node will set at step 532 the assigned ID in the remote ID map.

Figure 6:
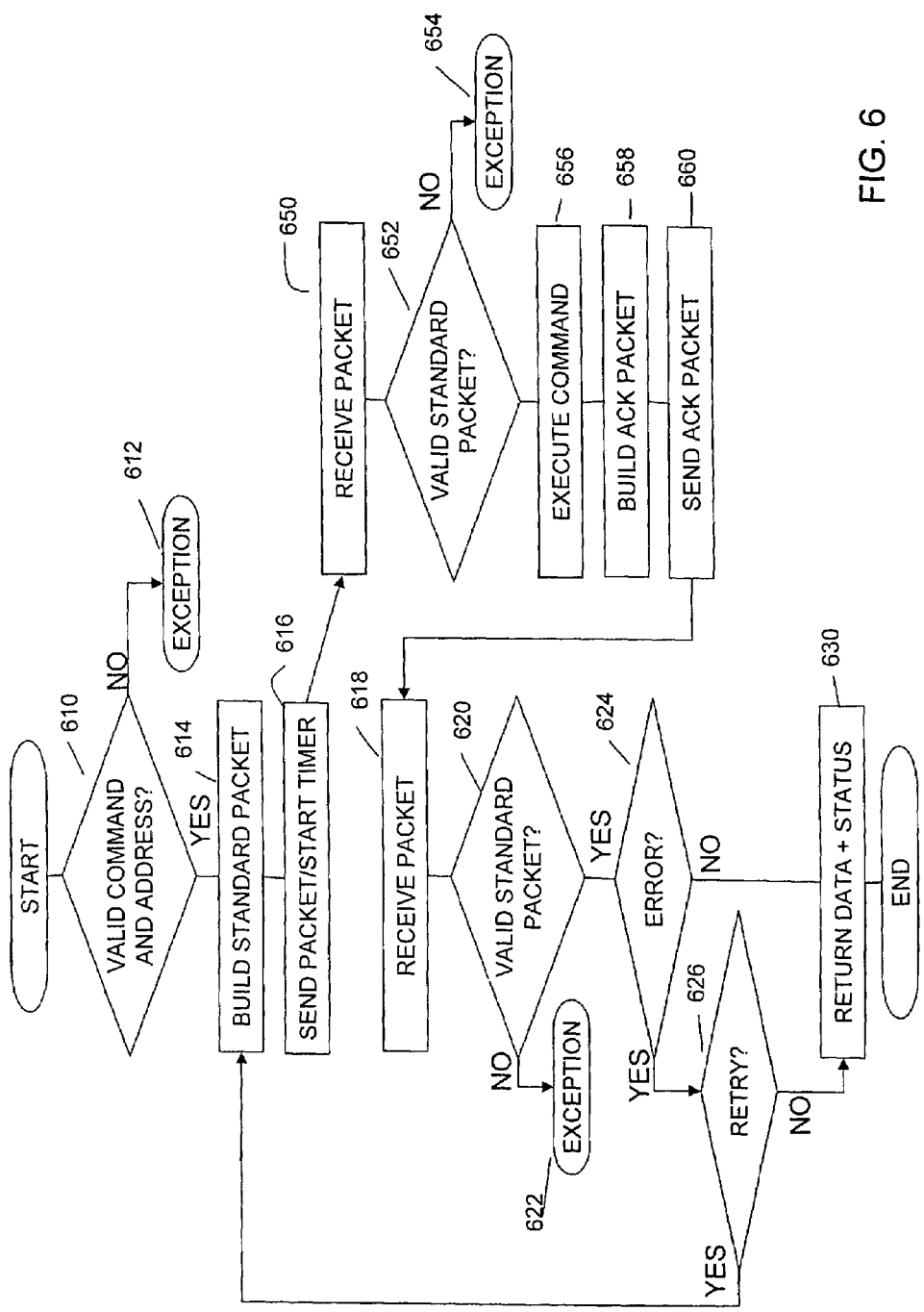
FIG. 6 is a flow chart useful in understanding the sequence of events in transmitting a standard packet by the root node.

FIG. 6 shows the process of sending a standard packet from the root node. After ID's are assigned to all nodes, the process of sending a standard packet begins when the root node receives instructions from an application program running on computer 142 to send a command. At step 610, the root node verifies that the command it is to send is a valid command for the network. It also validates that the address to which the command will be sent is a valid ID on the network.

If the command or address is invalid, execution proceeds to step 612. Step 612 is an exception handling process. Various routines can be performed in response to an exception condition. For example, controller 310 might signal to computer 142 that an incorrect command or address has been provided.

When a valid command and address are provided, the process continues at step 614. At step 614, controller 310 builds a standard packet. The standard packet has the format shown in FIG. 4B. Part of building a standard packet is to indicate which line in a link the response should be sent on. Various methods could be used to select the response line. For example, the line to use for a response could be selected randomly or the line to use for a response could alternate from packet to packet. As a further alternative, the line for response could be selected dynamically based on the amount of information in the buffer for each line. At the time of sending a standard packet the buffer with the smallest amount of information might be selected.

At step 616, controller 310 initiates the transmission of the standard packet. In the embodiment of FIG. 3 one of the lines in each link is dedicated to outbound packets. For example, link 212A includes line 250₂ that transmits outbound packets. Controller 310 transmits the message on the outbound line by sending the packet to a transmitter such as 322. Controller 310 also starts a timer at step 616. This timer is used to detect errors. If the timer times out before a valid response is received, controller 310 might begin an exception processing routine such as is indicated at step 622.

The standard packet transmitted from controller 310 will in normal operation be received by the intended remote node. Processing proceeds at steps 650, 652, 654, 656, 658 and 660 at the remote node. At step 650, the remote node receives the packet. In the case of remote node 210A, the packet is received by receiver 372. Receiver 372 checks that no errors are introduced into the packet during transmission. If the packet contains codes that do not correspond to valid codes or the CRC value at the end of the packet is not consistent with the values in the other fields in the packet, receiver 372 will ignore the inbound message. If there are no errors in the packet, receiver 372 stores it in buffer 380.

At step 652 controller 360 reads the packet from the buffer 380. Because the inbound packet is a standard packet, it will be read from the buffer in turn. At step 652, controller 360 determines whether the packet read from the buffer contains values consistent with a valid packet. For example, the packet should have an address corresponding to the node ID of the node receiving the packet. Also the command field of the packet should have a command that is valid for standard packets in the outbound mode.

If the packet is not a valid standard packet, processing proceeds at step 654. Step 654 represents an exception handling step. In its simplest form, controller 360 might respond by ignoring the inbound packet.

Where a valid standard packet is received, execution proceeds at step 656. The command contained within the standard packet is executed. Execution of the command involves providing an indication to the device such as device 354 connected to the node that the command has been received. The device then executes the command. In the example of a data acquisition system shown in FIG. 1, the device might be a radiation detector and the command might indicate that the device should collect a certain number of samples. Regardless of the specific device or action taken in response to the command, device 354 should indicate to controller 360 when the command has been executed. Device 354 must also provide controller 360 with any data required to appropriately respond to the command.

At step 658 controller 360 formats this information into an acknowledgment packet. Controller 360 inserts the command code for an acknowledgment in the command field 472 of the standard packet. It also provides the remote node address in field 474. In addition, it fills in field 476 with a value indicating the amount of data provided by device 354. That data is inserted in field 478 of the standard packet. Controller 360 is then able to compute the CRC value for field 480.

Once the standard packet is built, it is transmitted at step 660. In the case where there are multiple inbound lines, such as 250₃ and 250₄, controller 360 will transmit the packet on the appropriate inbound line designated in subfield 490 of the command field 472 in the message that initiated the action by device 354.

The packet transmitted by the remote node is received at the root node at step 618. Because the acknowledgment packet is a standard packet, it is stored in a buffer, such as 330 or 332, associated with the line on which the packet was transmitted. Controller 310 reads the packet from the buffer in accordance with its scheduling routines.

At step 620 a check is made whether the packet is in the format of a valid standard packet. For example, the acknowledgment should come from a remote node from which the controller has issued a command. If the packet is not in the form of a valid standard packet, execution proceeds to exception handler at step 622. Various operations might be taken in response to an invalid packet. However a simple response might be to simply ignore invalid packets.

When a valid packet is received, execution continues at step 624. At step 624, controller 310 checks the content of the packet received to determine whether an error in command processing occurred. For example, rather than receiving an acknowledgement that the command was completed, the standard packet might contain a negative acknowledgment, indicating that the device 354 could not perform the indicated command. If an error occurred, processing proceeds to step 626.

At step 626 a check is made as to whether the command should be resent. Various criteria might be used to determine whether a command should be resent. For example, a command will not be resent if the timer set at step 616 has timed out, indicating that too long a period has passed. Alternatively, the number of times that a message should be transmitted might be limited. If this limit has been reached, the command packet is not retransmitted.

If it is determined at step 626 that a message should be retransmitted, processing proceeds to step 614 where a new packet is built and sent. Where it is determined at step 626 that the message should not be retried, processing proceeds to step 630. At step 630 controller 310 provides the results of the command over bus 152. In the system illustrated in FIG. 1, the results of the command are returned to computer 142. In the case where an error was detected at step 624, data is not returned to computer 142 at step 630. Rather, a status message indicating that the command was not performed is returned. Where it is determined at step 624 that no error exists, processing proceeds to step 630. At step 630 the data received from the remote node is returned to the computer 142 that requested the command be performed. In this case, the status indicates that the command was properly performed.

Figure 7:
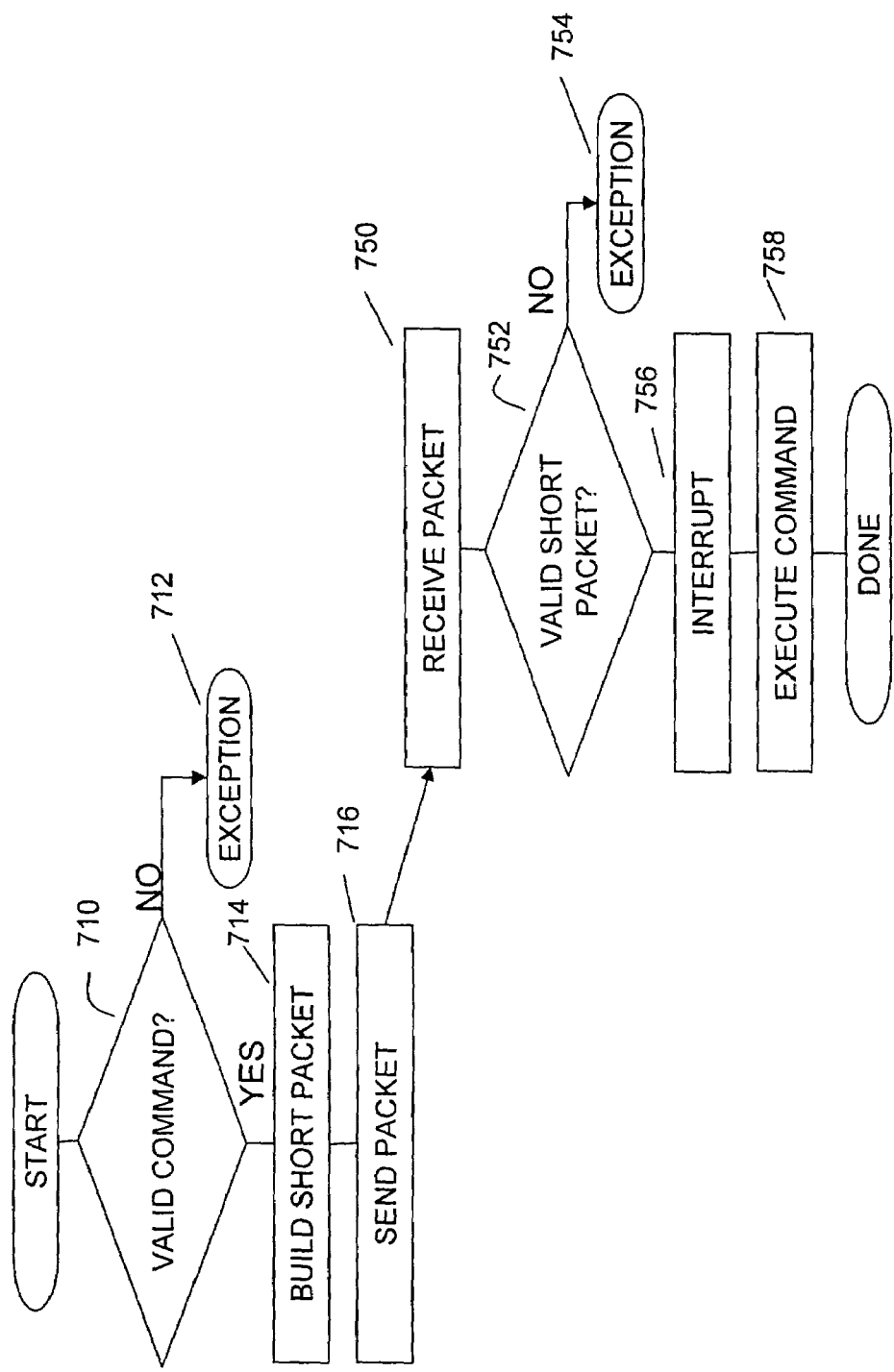
FIG. 7 is a flow chart useful in understanding the transmission of a short packet by the root node.

FIG. 7 shows the process of sending a short packet such as is illustrated by short packet 410 in FIG. 4A. In the description that follows, it is assumed that the short packet is sent by root node 146 to a remote node such as 210A. Remote nodes may also send short packets to root node 146. The valid commands for inbound short packets are different than the valid commands that may be used in outbound short packets. However, the processing at the sending and receiving nodes will be the same for both inbound and outbound short packets.

The process of sending a short packet begins at step 710. At step 710 the sending node verifies that the command it has been instructed to send corresponds to a valid command. If the command is invalid, the processing proceeds at step 712, which is an exception handling routine. Various actions may be taken at step 712. A simple response to an instruction to send a packet with an invalid command is to return an error to the application instructing the command to be sent.

If the command to be sent is valid, the sending node constructs a short packet. As described above, the sending node builds a packet by inserting the appropriate command code in field 422 with any required payload data in field 424. The sending node appends the synchronization code in field 420 and computes the required CRC value for field 426.

The packet is then sent at step 716. In the embodiment illustrated in FIG. 3, one line in each link is dedicated for outbound messages. Any outbound short packets initiated by root node 146 will be sent on the line of the link containing the node that is intended to receive the packet. Inbound short packets are sent on one of the inbound lines of the link.

The short packet format 410 shown in FIG. 4A does not include an address field for the remote node that is to respond to the short packet. In this embodiment, it is assumed that all remote nodes to respond to short packets are at level one of each link. Alternatively, the short packet might be daisy chained from one node to the other in the link, requiring that all nodes in the link respond to the short packet.

Steps 750, 752, 754, 756 and 758 are performed by the receiving node. In the example of FIG. 3, the receiving node is node 210A. At step 750 the short packet is received. In the case of an outbound short packet sent over link 212A, the short packet will be received at receiver 372.

Receiver 372 contains sufficient logic circuitry to validate that the packet contains a valid command for a short packet. If an invalid packet is received, execution may proceed to step 754, which is an exception handler.

Where a valid short packet is received, receiver 372 does not place the packet in buffer 380. Rather, receiver 372 uses bypass line 384 to directly interrupt controller 360. Controller 360 performs interrupt processing at step 756. As in other computerized systems, interrupt processing may include such steps as storing the state of execution so that the interrupted operation may be resumed later. At step 758, controller 360 causes the command to be executed. Controller 360 provides command information to device 354. For example, if device 354 samples data, the command might activate the device to begin sampling.

The protocol described above can provide multiple advantages. One advantage is that it has very low latency for command messages. But, by providing the ability to send large packets with large payloads, the throughput is very high. This protocol is well suited for used in a data acquisition system, such as an inspection system. Commands can be processed quickly, allowing modules to be synchronized on other real-time control functions. But, the protocol also accommodates large amounts of data with very low packet overhead, leading to efficient data processing.

The protocol also has good noise immunity, further increasing the benefits it provides in a data acquisition system. Such systems tend to be noisy.

Further, the protocol can be inexpensively implemented. The cables used to interconnect nodes are very simple. In the illustrated embodiments, four twisted pairs are used in each cable. Because cables, even those used for standard protocols, are often expensive, having simple cables can provide a cost advantage. Further, using an external clock distributed by the root node avoids the cost of clock recovery circuits at individual nodes.

Having thus described several aspects of at least one embodiment of this invention, it is to be appreciated various alterations, modifications, and improvements will readily occur to those skilled in the art.

For example, the protocol is not limited to use in an inspection system. It could be used in other electronic data acquisition systems or other electronic systems where its unique features provide a benefit. However, it should be appreciated that not all uses of the invention will employ every feature or will need all of the possible advantages described above.

Also, the commands listed above are examples of the types of commands that might be communicated over a bus. Many other commands might be used. One command that might be useful in some applications is a master reset command. The root node might send such a command to cause all of the remote nodes to reset.

Also, packet formats are described to contain a payload field. In the described embodiments, the payload contains data used by or generated in response to a command. However, the payload can more generally contain any type of information, including commands or data.

As another example, the physical media interconnecting nodes is described as CAT-5 cables. Other types of cables might be used or other media might be used, including optical fiber or wireless links might be employed Further, messages are described as being passed by each remote node without buffering or processing to facilitate daisy-chaining of remote nodes with little latency. Alternatively, each remote node might process a message before retransmitting it. Such a process could, for example, facilitate messages sent between remote nodes. Also, in the illustrated embodiment, standard packet transmission is always initiated from the root node. Even standard packets transmitted by the remote nodes are sent in reply to messages sent by the root node. This limitation simplifies processing of hardware because any node that receives a standard packet is monitoring received packets for the packet. All the communications needed by the inspection used as an example can be completed with these limitations. However, the techniques described herein need not be so limited and can be used in networks in which remote nodes initiate standard packet transmissions. Such alterations, modifications, and improvements are intended to be part of this disclosure, and are intended to be within the spirit and scope of the invention. Accordingly, the foregoing description and drawings are by way of example only.

What is claimed is:

1. A network comprising:
   a) a root node;
   b) a plurality of remote nodes, each comprising a receiver, a buffer and control logic; and
   c) a plurality of serial communication links interconnecting the root node to each of the remote nodes of the plurality of remote nodes, each serial communication link of the plurality of serial communication links comprising:
      i) at least one first line carrying at least two types of packets from the root node to a first remote node of the plurality of remote nodes;
      ii) at least one second line carrying packets from the first remote node to the root node; and
      iii) at least one third line, distinct from the at least one first line and the at least one second line, carrying a clock signal from the root node to the first remote node,
   wherein a second type of packet received at the first remote node is stored in the buffer and processed by the control logic in order of reception and a first type of packet received at the first remote node causes an interrupt to the control logic whereby the first type of packet is processed by the control logic in response to the interrupt.

2. The network of claim 1, wherein each of the at least one first line, at least one second line, and at least one third line comprises a twisted pair.

3. The network of claim 2, wherein each of the serial communication links comprises a Category 5 (CAT-5) cable.

4. The network of claim 3, wherein each of the Category 5 (CAT-5) cables is terminated with a Registered Jack 45 (RJ-45) connector.

5. The network of claim 1, wherein at least some of the plurality of the remote nodes are connected in a daisy chain configuration.

6. The network of claim 1, wherein the clock signal has a frequency between 20 MHz and 120 MHz.

7. The network of claim 1, wherein the first type of packet and the second type of packet comprise a plurality of fields, and wherein each of the first type of packet and the second type of packet comprises a payload field comprising a plurality of bytes, wherein a maximum number of bytes in the payload field of the first type of packet is less than a maximum number of bytes in the payload field of the second type of packet.

8. The network of claim 7, wherein the second type of packet comprises a size field indicating the number of bytes of data in the payload field, wherein a maximum value in the size field is greater than the numbered bytes in the payload field in packets of the first type.

9. The network of claim 8, wherein the second type of packet comprises an address field and the first type of packet does not comprise an address field.

10. The network of claim 7, wherein each of the bytes is transmitted over one of the serial communication links as two nibbles, each represented with a 6 bit code.

11. The network of claim 7, wherein the first and second types of packets each comprise at least two forms of error detection.

12. The network of claim 11, wherein one form of error detection comprises a Cyclic Redundancy Check (CRC) field in each of the packets.

13. The network of claim 11, wherein one form of error detection comprises a redundant coding scheme.

14. The network of claim 7, wherein packets of the first type of packet comprise a fixed length payload in the payload field and packets of the second type of packet comprise a variable length payload in the payload field.

15. The network of claim 14, wherein the variable length payload has a minimum length of 0 bytes and a maximum length of 65,535 bytes.

16. The network of claim 14, wherein the second type of packet has less than 10 bytes of overhead.

17. A method of operating an electronic system comprising a network, the network comprising a root node and a plurality of remote nodes, the method comprising:
   sending a clock signal from the root node to a remote node of the plurality of remote nodes;
   sending, in synchronization with the clock signal, packets of a first type from the root node to the remote node comprising a command to control the remote node and not comprising an address field;
   at the remote node, processing without buffering the packets of the first type; and
   sending packets of a second type from the remote node to the root node comprising a payload containing data acquired at the remote node and comprising an address field indicating an address of the remote node sending the packets of the second type, wherein receipt of a packet of the first type at the remote node causes the remote node to interrupt processing operations and process the packet of the first type.

18. The method of claim 17, wherein the packets of the first type are short packets, and wherein the packets of the second type are standard packets having a variable length payload.

19. The method of claim 17, wherein the receipt of a packet of the first type at the remote node causes the remote node to interrupt processing operations at a first pulse of the clock signal, and wherein processing of the packet of the first type by the remote node begins on a next pulse of the clock signal after the first pulse of the clock signal.

20. The method of claim 17, wherein the method further comprises processing packets of the second type received at the root node from the remote node, and wherein the electronic system comprises an application level, and wherein processing the packets of the first and second types comprises providing information to the application level.

21. The method of claim 20, further comprising:
   using, at the application level, information provided by the network as a result of a packet of the first type for timing of an application event.

22. The method of claim 17, further comprising:
   assigning addresses to each remote node of the plurality of remote nodes.

23. The method of claim 22, wherein assigning addresses comprises, for each remote node of the plurality of remote nodes:

transmitting a request from the remote node to the root node using a packet of the first type;

transmitting an address to the remote node using a packet of the first type; and transmitting an acknowledgement.

24. A method of operating an electronic system having an application level and a network, the network comprising a plurality of nodes, including a first node and a second node, with each of the nodes having packet processing circuitry that sends packets of a first type over the network in response to commands from an application layer of the electronic system, the method comprising:

distributing a clock signal from the first node to the second node;

transmitting a plurality of packets of a second type from the first node to the second node, the packets of the second type having a variable length payload including data upon which the second node is to act;

receiving, from the application layer, a first command at the first node, the first command indicating the first node is to send a second command in the form of a packet of the first type to control the collection of data by a radiation detection module coupled to the second node;

interrupting transmission of a first packet of the plurality of packets from the first node to the second node in response to receiving the first command at the first node from the application layer; and transmitting the second command using the first node, wherein the clock signal is distinct from the plurality of packets and the second command, and wherein transmitting the plurality of packets of a second type from the first node to the second node is synchronized to the clock signal, interrupting transmission of a first packet of the plurality of packets is synchronized to the clock signal, and transmitting the second command using the first node is synchronized to the clock signal.

25. The method of claim 24, wherein upon transmission of the second command, the first node restarts transmission of the first packet of the plurality of packets in its entirety.

26. The method of claim 24, wherein the first type of packet is a short packet type having a fixed payload length.

27. The method of claim 26, wherein the second type of packet has a longer payload length than the payload length of the first type of packet.

28. A data acquisition system, comprising:

a data processor coupled to a root node of a network;

a clock generator configured to transmit a clock signal from the root node to at least some of the plurality of remote nodes;

at least one radiation source configured to radiate objects of interest;

a plurality of electronic modules configured to detect radiation from a radiation source, each electronic module of the plurality of electronic modules acquiring data indicative of detected radiation in response to a command sent over the network from the root node in the form of a packet of a first type, and each coupled to a remote node of a plurality of remote nodes of the network; and the network, interconnecting the plurality of electronic modules and the data processor, and comprising the root node coupled to the data processor and the plurality of remote nodes, the root node and each of the remote nodes of the plurality of remote nodes having packet processing circuitry to process at least the first type of packet and a second type of packet, the packet processing circuitry including a buffer to store the second type of packet and bypass circuitry for the first type of packet.

29. The data acquisition system of claim 28, further comprising a conveyor between the at least one radiation source and at least one of the electronic modules.

30. The data acquisition system of claim 29, further comprising a display coupled to the data processor, wherein the display comprises an interface for viewing at least a portion of an object located on the conveyor.

31. The data acquisition system of claim 28, wherein the clock generator is an external clock generator.

32. The data acquisition system of claim 28, wherein the first type of packet is a short packet type, and wherein the second type of packet is a long packet type having a variable length payload configured to include data collected by at least one of the plurality of electronic modules.

* * * * *